United States Patent

König et al.

Patent Number: 5,523,377
Date of Patent: Jun. 4, 1996

[54] BLOCKED POLYISOCYANATES

[75] Inventors: Eberhard König, Leverkusen; Theodor Engbert, Köln; Thomas Klimmasch, Leverkusen; Manfred Bock, Leverkusen, all of Germany

[73] Assignee: Bayer Aktiengesellschaft, Leverkusen, Germany

[21] Appl. No.: 336,029

[22] Filed: Nov. 8, 1994

[30] Foreign Application Priority Data

Nov. 18, 1993 [DE] Germany .......................... 43 39 367.5

[51] Int. Cl.⁶ .................................................. C08G 18/80
[52] U.S. Cl. .................. 528/45; 252/182.2; 252/182.21; 252/182.22; 548/262.2; 525/124; 525/127
[58] Field of Search .......................... 528/45; 252/182.2, 252/182.21, 182.22; 548/262; 525/124, 127

[56] References Cited

U.S. PATENT DOCUMENTS

| | | | |
|---|---|---|---|
| 4,369,301 | 1/1983 | König et al. | 528/45 |
| 4,482,721 | 11/1984 | Wegner | 548/262 |
| 5,091,475 | 2/1992 | Potter | 525/124 |
| 5,112,931 | 5/1992 | Potter | 528/45 |

*Primary Examiner*—Rachel Johnson
*Attorney, Agent, or Firm*—Joseph C. Gil; Thomas W. Roy

[57] ABSTRACT

Blocked (cyclo)aliphatic polyisocyanates wherein 30 to 70 equivalent-% of the isocyanate groups are blocked with butanone oxime, 30 to 70 equivalent-% of the isocyanate groups are blocked with 1,2,4-triazole and 0 to 30 equivalent-% of the isocyanate groups are blocked with other blocking agents; a method for their preparation by blocking lacquer polyisocyanates with these blocking agents, optionally with the prior, simultaneous or subsequent modification of the polyisocyanates with hydrazine derivatives containing one or more isocyanate-reactive groups; and the use of the blocked polyisocyanates as cross-linking agents for organic polyhydroxy compounds in one-component polyurethane stoving compositions.

5 Claims, No Drawings

BLOCKED POLYISOCYANATES

BACKGROUND OF THE INVENTION

1. Field of the Invention

The present invention relates to new blocked polyisocyanates, to a method for their preparation and to their use for the preparation of one-component coating compositions which may be stoved at comparatively low temperatures of 130° to 160° C. to provide coatings with a reduced tendency to yellow upon heating.

2. Description of the Prior Art

Multilayer coatings having a glossy clear top coat based on blocked polyisocyanates and organic polyhydroxy compounds, for example, polyhydroxy polyacrylates, are gaining ever increasing importance due to their excellent properties, particularly as automotive coatings.

In this connection, butanone oxime is a conventional blocking agent for polyisocyanates which have come onto the market. Its advantages include, for example, a favorable price and a relatively low splitting temperature of approximately 150° C. (without catalysis). It also reacts well with polyisocyanates and in doing so gives rise to noncrystalline products.

A blocking agent which has previously not gained the technical importance of butanone oxime is 1,2,4-triazole, which is described in DE-OS 2,812,252. Due to the tendency of polyisocyanates blocked with 1,2,4-triazole to crystallize, the preferred application of isocyanate crosslinking agents blocked with this blocking agent is in the field of powder coatings.

One-component polyurethane stoving enamels containing polyisocyanates blocked by butanone oxime have a marked tendency to yellow at high stoving temperatures or when the stoving process is of long duration.

Therefore, an object of the present invention is to provide new blocked polyisocyanates which have a reduced tendency to yellow upon heating and also have coating properties that are at least as good as those of polyisocyanates blocked with butanone oxime.

This object may be achieved with the mixed-blocked polyisocyanates according to the invention, which are described in more detail below. The blocked polyisocyanates according to the invention are blocked with butanone oxime and 1,2,4-triazole and optionally with other known blocking agents. By using the mixed blocking a distinct advance is made in achieving the objects of the present invention. A further improvement is possible through the simultaneous incorporation of specific hydrazine adducts described in more detail below.

SUMMARY OF THE INVENTION

The present invention relates to (cyclo)aliphatic polyisocyanates wherein at least 95% of the isocyanate groups are blocked by blocking agents, the polyisocyanates have a content of unblocked and blocked isocyanate groups (calculated as NCO) of 5 to 25% by weight, and A) 30 to 70 equivalent-% of the isocyanate groups are blocked with butanone oxime, B) 30 to 70 equivalent-% of the isocyanate groups are blocked with 1,2,4-triazole and C) 0 to 30 equivalent-% of the isocyanate groups are blocked with blocking agents other than A) and B),
wherein the percentages of A), B) and C) add up to 100.

The present invention also relates to a process for the preparation of these polyisocyanates by a) optionally reacting up to 20 NCO-equivalent-% of the isocyanate groups of a polyisocyanate component containing one or more polyisocyanates having (cyclo)aliphatically bound isocyanate groups and an isocyanate content of 7 to 30% prior to, during and/or after step b) with one or more compounds having at least one hydrazinocarbonyl group and at least one group that is reactive towards isocyanate groups such that the resulting, blocked polyisocyanate contains up to 4% by weight, based on solids, of chemically fixed structural units corresponding to the formula

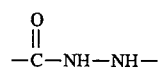

and b) reacting at least 95 equivalent-% of the isocyanate groups which are not reacted with said compounds having at least one hydrazinocarbonyl groups with blocking agents, which may be used in any order or in admixture, in amounts such that A) 30 to 70 equivalent-% of the isocyanate groups are blocked with butanone oxime, B) 30 to 70 equivalent-% of the isocyanate groups are blocked with 1,2,4-triazole and C) 0 to 30 equivalent-% of the isocyanate groups are blocked with at least one blocking agent other than A) and B), wherein the percentages of A), B) and C) add up to 100.

Finally, the present invention relates to one-component polyurethane stoving compositions wherein the binders contain the blocked polyisocyanates as cross-linking agents for organic polyhydroxy compounds.

DETAILED DESCRIPTION OF THE INVENTION

The advantages gained by the mixed blocking according to the invention are an improved resistance of the stoving enamel to yellowing, the possibility of reducing the stoving temperature to approximately 145° C., without the use of catalysts and the improved compatibility of the blocked polyisocyanates according to the invention with the remaining components of the stoving enamel.

By means of mixed blocking, the disadvantage of the triazole blocking agents (i.e., crystallization of the triazole-blocked polyisocyanates) is avoided and despite the use of large quantities of butanone oxime, the tendency to yellow during stoving is reduced to the level obtained by using the triazole alone.

The polyisocyanates used to prepare the blocked polyisocyanates according to the invention are known lacquer polyisocyanates having aliphatically and/or cycloaliphatically (i.e., (cyclo)aliphatically) bound isocyanate groups and an isocyanate content of 7 to 30, preferably 12 to 25% by weight. Examples of the lacquer polyisocyanates are those having biuret groups, isocyanurate groups and/or uretdione groups which are prepared from 1,6-diisocyanatohexane (HDI), 1-isocyanato-3,3,5-trimethyl- 5-isocyanatomethyl cyclohexane (IPDI) and/or 4,4'-diisocyanatodicyclohexylmethane. Lacquer polyisocyanates containing isocyanurate groups and prepared from (i) IPDI, (ii) mixtures of IPDI and 4,4'-diisocyanato-dicyclohexylmethane or (iii) 1,6-diisocyanatohexane are particularly preferred.

Butanone oxime is used as blocking agent A) and 1,2,4-triazole is used as blocking agent B). Other optional blocking agents include secondary amines such as diisopropylamine or imidazole, CH-acid compounds such as diethyl malonate, and ε-caprolactam.

According to a preferred embodiment of the method according to the invention, the starting polyisocyanates to be blocked are reacted prior to, during and/or after the blocking reaction with up to 20 equivalent-%, preferably 1 to 12 equivalent-% (based on the groups of the hydrazine adduct which are reactive towards isocyanate groups and the isocyanate groups of the starting polyisocyanates), of compounds having at least one structural unit corresponding to the formula

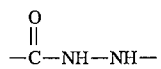

per molecule and at least one group reactive towards isocyanate groups other than the structural unit. The quantitative ratios of the reactants in this modification are preferably selected so that the blocked polyisocyanates according to the invention contain up to 4% by weight of the structural units corresponding to the previous formula.

Hydrazine adducts suitable for this modification reaction include those corresponding to the formula

wherein
R represents an ethylene, isopropylene or 1,3-neopentyl radical.

The hydrazine adducts can be obtained by reacting 1 mole of hydrazine hydrate with 2 moles of a cyclic carbonate such as ethylene carbonate, isopropylene carbonate or 1,3-neopentyl carbonate, e.g., in boiling toluene. The water in the hydrate is removed by azeotropic distillation.

Other hydrazine adducts suitable for the modification reaction according to the invention include the compounds described in U.S. Pat. No. 5,216,078, in particular the hydrazine adduct available from Elf-Atochem as Luchem HA-R 100 and having the formula

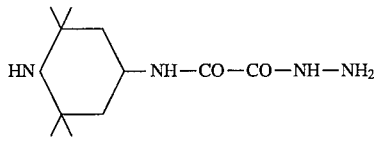

In the method according to the invention, blocking agents A), B) and C) are used in quantities such that the equivalent ratio of isocyanate groups of the starting polyisocyanates (excluding those NCO-groups required for optionally incorporating the hydrazine adduct) to NCO-reactive groups of the blocking agent is 0.95:1 to 1.2:1, preferably 1:1 to 1.1:1. The isocyanate groups of the polyisocyanates according to the invention are therefore at least 95% blocked and are preferably completely blocked.

The performance of the method according to the invention generally takes place at a temperature of 20 to 120, preferably 50 to 100° C., in melt form or in suitable solvents such as n-butyl acetate, methoxypropyl acetate, toluene or higher aromatic solvent mixtures such as Solvesso solvent (available from Exxon).

The method according to the invention may be conducted by dissolving isocyanate component and adding the first blocking agent, for example, component B). The reaction with 1,2,4-triazole is conducted at 100° C. for approximately 1 hour until the calculated NCO content is obtained. The reaction mixture is then cooled, for example, to 50° C., and reacted with the more reactive component A) until the NCO content is no longer detectable by IR spectroscopy. The reaction mixture may then be adjusted to the desired viscosity by adding solvent.

When the blocked polyisocyanates according to the invention are additionally modified by incorporation of the previously described hydrazine adducts, they may be incorporated at any time prior to, during and/or after the blocking reaction. For example, the hydrazine adducts containing hydroxyl groups may be added to the reaction mixture after blocking with the blocking agent B) and prior to using the blocking agent A). When using the preferred Luchem HA-R 100 hydrazine adduct, it is recommended that the latter be incorporated together with blocking agent A), for example, by using appropriate solutions of the hydrazine adduct in butanone oxime.

The predominantly or completely blocked polyisocyanates according to the invention are valuable cross-linking resins for organic polyhydroxy compounds in the preparation of stoving enamels. In this connection, they can be used instead of the blocked polyisocyanates previously used for this purpose. Suitable polyhydroxy compounds are known and details regarding the preparation and application of the stoving enamels can be found in the relevant literature. A particularly preferred field of application for the products according to the invention are as cross-linking agents for stoved polyurethane clear coats which find application as topcoats particularly multilayer automotive coatings. Polyhydroxy compounds which are suitable as co-reacants for the blocked polyisocyanates according to the invention are the known polyester polyols, polyacrylate polyols or mixtures thereof.

In the following examples all parts and percentages are by weight unless otherwise indicated.

EXAMPLES

The following polyol components were used in the examples below:

| | | |
|---|---|---|
| 80 OH-equivalent-% | Acrylate 1 | 290 g |
| 20 OH-equivalent-% | Polyester 1 | 90 g |
| 100 OH-equivalent-% | 1 g. equiv. of OH-component | 380 g |

Acrylate I was a 75% solution in xylene of a commercially available acrylic resin wherein the solution has a hydroxyl group content of 4.7% (Desmophen A, trial product LS 2051 from Bayer AG, Leverkusen).

Polyester I is an 80% solution in n-butyl acetate of a commercially available branched polyester polyol (Desmophen, trial product LS 2971 from Bayer AG, Leverkusen). The hydroxyl content of the solution is 3.8%.

Example 1 (according to the invention)

Preparation of a mixed-block polyisocyanate according to the invention

Charge:

720 g (2.0 g. equiv.)  of a lacquer polyisocyanate containing isocyanurate groups, prepared from IPDI -continued

| Charge: | | |
|---|---|---|
| | | and present as a 70% solution in Solvesso 100 solvent, NCO-content of the solution - 11.6% |
| 69 g | (1.0 g. equiv.) | 1,2,4-triazole |
| 87 g | (1.0 g. equiv.) | butanone oxime |
| 224 g | | methoxypropyl acetate |

Procedure:

The polyisocyanate and methoxypropyl acetate were mixed together and crystalline flakes of 1,2,4-triazole were added to the stirred solution. The reaction mixture was heated to 100° C., during which time triazole dissolves and reacts with a portion of the NCO-groups. After a reaction time of approximately one hour, an NCO-content of 4.0% was obtained; the calculated value was 4.15%. The reaction mixture was cooled to approximately 50° C. and butanone oxime was added dropwise (exothermic reaction) in a quantity such that the temperature did not rise above 70° C. After the addition of butanone oxime was complete, the reaction was continued for approximately 1 hour at 70° C. Thereafter, no NCO groups were detectable in the solution by IR spectroscopy. A blocked polyisocyanate having an NCO-equivalent weight of the solution (based on to the blocked isocyanate groups) of 550 g was obtained. The viscosity (23° C.) of the solution was 30,000 mPa.s.

Example 2. (Control)

A commercially available polyisocyanate blocked only with butanone oxime, prepared from the lacquer polyisocyanate containing isocyanurate groups described in Example 1, and present as a 65% solution in Solvesso 100 solvent. The NCO-equivalent weight of the solution (based on the blocked isocyanate groups) was 518. The viscosity of the solution (23° C.) was 14,000 mPa.s.

Example 3 (according to the invention)

This example differs from Example 1 due to the additional incorporation of a hydrazine adduct prepared from 1 mole of hydrazine hydrate and 2 moles of propylene carbonate and having a molecular weight of 236 and corresponding to the structural formula

| Charge: | | |
|---|---|---|
| 792 g | (2.2 g. equiv.) | of the lacquer polyisocyanate containing isocyanurate groups described in Example 1 |
| 69 g | (1.0 g. equiv.) | 1,2,4-triazole |
| 87 g | (1.0 g. equiv.) | butanone oxime |
| 23.6 g | (0.2 g. equiv.) | of the above hydrazine adduct |
| 253.4 g | | methoxypropyl acetate |

Procedure:

The polyisocyanate and methoxypropyl acetate were mixed together and crystalline flakes of 1,2,4-triazole (Fp. 120° C.) were added to the stirred solution. The mixture was heated to 100° C. in stages, during which time the 1,2,4-triazole completely dissolved. The melted hydrazine adduct was then added in one pouring and reacted for 1 to 2 hours at 100° C. until the NCO-content had fallen to approximately 3.8; the calculated value was 3.7. The reaction mixture was then cooled to 50° C. and butanone oxime was added in a manner such that the temperature did not rise above 70° C. After reaction for a further hour, additional small quantities of butanone oxime were added until no NCO groups were detectable by IR spectroscopy.

A clear, colorless solution (60%) of a mixed blocked polyisocyanate having an NCO-equivalent weight (based on blocked isocyanate groups) of the solution of 612.5 g was obtained. The viscosity (23° C.) of the solution was 25,000 mPa.s.

Example 4 (according to the invention) In this example a mixture of an IPDI trimer and an HDI trimer was used as the starting polyisocyanate. The procedure was analogous to Example 3.

| Charge: | | |
|---|---|---|
| 587.0 g | (1.63 g. equiv.) | of the lacquer polyisocyanate containing isocynaurate groups described in Example 1 |
| 200.0 g | (1.0 g. equiv.) | of a commercially available lacquer polyisocyanate containing isocyanurate groups, prepared from 1,6-diisocyanato-hexane and having an NCO-content of about .21% and a viscosity at 23° C. of about 3,000 mPa · s. |
| 79.3 g | (1.15 g. equiv.) | 1,2,4-triazole |
| 100.0 g | (1.15 g. equiv.) | butanone oxime |
| 39.0 g | (0.33 g. equiv.) | of the hydrazine-propylene carbonate adduct described in Example 3 |
| 383.7 g | | methoxypropyl acetate |

Procedure:

The two polyisocyanates and the methoxypropyl acetate were mixed together and crystalline flakes of 1,2,4-triazole were added to the solution with stirring. The temperature was elevated to 100° C. during which time the triazole (Fp. 120° C.) dissolved. The reaction was continued at 100° C. for 1 hour. The melted hydrazine adduct was then added in one pouring and the reaction continued for a further 2 hours at 100° C., until an NCO-content of 3.8% was attained; the calculated value was 3.75%. The reaction mixture was cooled to 50° C. and butanone oxime was added in a manner such that the temperature did not exceed 70° C. Stirring was continued at 70° C. for approximately 1 hour until no further NCO-groups were detectable by IR spectroscopy and the mixture was then decanted.

An almost colorless solution (60%) of a mixed blocked polyisocyanate having a viscosity (23° C.) of approximately 2,000 mPa.s and an NCO-equivalent weight (based on to blocked isocyanate groups) of the solution of 695 g was obtained.

Example 5

The compositions of clear varnishes composed of the above-mentioned polyol component with the blocked cross-linking agents from Examples I to 4, the conditions of application and stoving, and the yellowing on heating are described below.

1. Composition of clear varnish

The clear varnishes were prepared by mixing the blocked polyisocyanates from Examples 1 to 4 with the above-mentioned polyol mixture of acrylate I/polyester I in quantities sufficient to provide an NCO/OH equivalent ratio of 1:1, with the addition of a catalyst, as given below.

| Clear Varnish formulation | Polyisocyanate | Polyol Mixture Acrylate I/Polyester II | Catalysis 0.1% of dibutyltin dilaurate |
|---|---|---|---|
| A | Example 1 550 g | 380 g | 0.9 g |
| B | Example 2 518 g | 380 g | 0.9 g |
| C | Example 3 612.5 g | 380 g | 1.0 g |
| D | Example 4 695 g | 380 g | 1.0 g |

2. Application and yellowing on heating

The above clear varnishes were applied at a wet film thickness of approximately 120 to 150 μm to test plates coated with a commercially available white foundation coating (from Spies & Hecker, Cologne).

The test plates were then stored for 30 minutes at 140° C. in a drying oven. Thereafter, the first color measurement according to the CIELAB method took place. The larger the positive b-value obtained by this method, the yellower the clear varnish.

This was followed by overstoying for 30 minutes at 160° C., after which the increase in the yellow colouration, the so-called Δb-value, was determined according to the CIELAB color system (DIN 6174). For clear varnishes which have not yellowed, this value should be as close as possible to 0.

The results for the clear varnishes A to D are summarized below in tabular form.

| Clear Varnish | Yellowing on heating after stoving (b) | Yellowing on heating after overstoving (Δb) | Layer thickness (μM) |
|---|---|---|---|
| A | 0.6 | 1.0 | 50 |
| B | 3.0 | 1.1 | 55 |
| C | 0.5 | 0.9 | 55 |
| D | 1.2 | 0.8 | 50 |

The above measurements show that the clear varnish B containing the polyisocyanate cross-linking agent from prior art (blocked with 100% butanone oxime) showed the strongest yellowing. The sum of the yellow values b+Δb from the two processes was 4.1.

It is also apparent that dear varnish C, which differs from dear varnish A only by the presence of the hydrazine adduct in the blocked polyisocyanate, was the most resistant to yellowing; the sum of the b+ Δb values was only 1.4.

The b+Δb value for the dear varnish D, which contained a polyisocyanate based on 1,6-diisocyanatohexane in addition to one based on IPDI, had the worst value for yellowing upon heating of the clear varnishes according to the invention. Nevertheless, the yellowness value for dear varnish D was still better than the value for prior art, clear varnish B. In addition, with a value for Δb equal to 0.8, clear varnish D had the best resistance to overstoving.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A (cyclo)aliphatic polyisocyanate wherein at least 95% of the isocyanate groups are blocked by blocking agents, the polyisocyanate has a content of unblocked and blocked isocyanate groups (calculated as NCO) of 5 to 25% by weight, and
   A) 30 to 70 equivalent-% of the isocyanate groups are blocked with butanone oxime,
   B) 30 to 70 equivalent-% of the isocyanate groups are blocked with 1,2,4-triazole and
   C) 0 to 30 equivalent-% of the isocyanate groups are blocked with blocking agents other than A) and B),
   wherein the percentages of A), B) and C) add up to 100.

2. The polyisocyanate of claim 1 which additionally contains a positive amount of up to 4% by weight of the blocked polyisocyanate, based on solids, of chemically fixed structural units corresponding to the formula

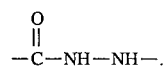

3. A process for the preparation of a (cyclo)aliphatic polyisocyanate which comprises
   a) optionally reacting up to 20 NCO-equivalent-% of the isocyanate groups of a polyisocyanate component containing one or more polyisocyanates having (cyclo)aliphatically bound isocyanate groups and an isocyanate content of 7 to 30% prior to, during and/or after step b) with one or more compounds having at least one hydrazinocarbonyl group and at least one group that is reactive towards isocyanate groups such that the resulting, blocked polyisocyanate contains up to 4% by weight, based on solids, of chemically fixed structural units corresponding to the formula

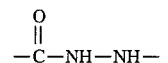

and
   b) reacting at least 95 equivalent-% of the isocyanate groups which are not reacted with said compounds having at least one hydrazinocarbonyl groups with blocking agents, which may be used in any order or in admixture, in amounts such that
   A) 30 to 70 equivalent-% of the isocyanate groups are blocked with butanone oxime,
   B) 30 to 70 equivalent-% of the isocyanate groups are blocked with 1,2,4-triazole and
   C) 0 to 30 equivalent-% of the isocyanate groups are blocked with at least one blocking agent other than A) and B),
   wherein the percentages of A), B) and C) add up to 100.

4. The process of claim 3 wherein said structural units are present in a positive amount up to 4% by weight.

5. A one-component polyurethane stoving composition wherein the binder comprises an organic polyhydroxy compound and the polyisocyanate of claim 1 as the crosslinking agent.

* * * * *